United States Patent
Xiao (10) Patent No.: US 9,521,237 B2
(45) Date of Patent: Dec. 13, 2016

(54) CELLULAR COMMUNICATION DEVICE WITH WIRELESS POINTING DEVICE FUNCTION

(71) Applicant: Creator Technology B.V., Tilburg (NL)

(72) Inventor: Browley Xiao, Shanghai (CN)

(73) Assignee: Creator Technology B.V., Tilburg (NL)

( * ) Notice: Subject to any disclaimer, the term of this patent is extended or adjusted under 35 U.S.C. 154(b) by 0 days.

(21) Appl. No.: 14/641,155

(22) Filed: Mar. 6, 2015

(65) Prior Publication Data

US 2015/0288793 A1    Oct. 8, 2015

Related U.S. Application Data (63) Continuation of application No. 14/047,635, filed on Oct. 7, 2013, now Pat. No. 8,983,538, which is a continuation of application No. 13/356,941, filed on Jan. 24, 2012, now Pat. No. 8,565,693, which is a continuation of application No. 11/966,927, filed on Dec. 28, 2007, now Pat. No. 8,103,223.

(51) Int. Cl.

| | |
|---|---|
| H04M 1/725 | (2006.01) |
| G06F 3/03 | (2006.01) |
| G06F 3/0354 | (2013.01) |
| H04M 1/21 | (2006.01) |
| H04M 1/02 | (2006.01) |
| G06F 3/0484 | (2013.01) |
| G06F 3/0486 | (2013.01) |
| H04W 4/00 | (2009.01) |
| H04W 68/00 | (2009.01) |

(52) U.S. Cl.
CPC ......... *H04M 1/7253* (2013.01); *G06F 3/0317* (2013.01); *G06F 3/03543* (2013.01); *G06F 3/0486* (2013.01); *G06F 3/04842* (2013.01); *G06F 3/04845* (2013.01); *G06F 3/04847* (2013.01); *H04M 1/0202* (2013.01); *H04M 1/21* (2013.01); *H04W 4/008* (2013.01); *H04W 68/005* (2013.01); *G06F 2203/0384* (2013.01); *H04M 2250/12* (2013.01)

(58) Field of Classification Search
CPC .................................................. H04M 1/0202
USPC ................ 455/90.1, 90.2, 557; 345/166, 167
See application file for complete search history.

(56) References Cited

U.S. PATENT DOCUMENTS

| | | | |
|---|---|---|---|
| 5,400,335 A | 3/1995 | Yamada | |
| 7,069,044 B2 | 6/2006 | Okada et al. | |
| 7,187,923 B2 | 3/2007 | Mousseau et al. | |
| 7,844,301 B2 * | 11/2010 | Lee et al. ...................... | 455/566 |
| 7,855,717 B2 | 12/2010 | Mattice et al. | |
| 8,462,693 B2 | 6/2013 | Montemurro et al. | |
| 2005/0254714 A1 * | 11/2005 | Anne ............................ | 382/233 |

(Continued)

OTHER PUBLICATIONS

International Search Report for International Application No. PCT/US08/88375 dated Feb. 5, 2009; 2 pages.

(Continued)

*Primary Examiner* — Tuan H Nguyen
(74) *Attorney, Agent, or Firm* — Jianq Chyun IP Office (57) ABSTRACT

A method and apparatus receive first input through a touch screen and communicate over a first wireless network responsive to the first input. The method and apparatus receive second input through the touch screen and use the second input to control a second device through a second wireless network.

7 Claims, 5 Drawing Sheets

(56) References Cited

U.S. PATENT DOCUMENTS

| | | | |
|---|---|---|---|
| 2006/0132438 A1* | 6/2006 | Oakley | G06F 3/03544 345/158 |
| 2006/0139378 A1 | 6/2006 | Hon et al. | |
| 2006/0200570 A1 | 9/2006 | Stirbu et al. | |
| 2007/0139378 A1 | 6/2007 | Siebert | |
| 2007/0207834 A1* | 9/2007 | Thijssen | G06F 1/1626 455/557 |
| 2007/0270217 A1 | 11/2007 | Rabin | |
| 2008/0165143 A1 | 7/2008 | Tolmasky et al. | |
| 2010/0231790 A1* | 9/2010 | Ansari | G06Q 30/04 348/552 |

OTHER PUBLICATIONS

USPTO Advisory Action for U.S. Appl. No. 11/966,927 dated Mar. 2, 2011; 4 pages.
USPTO Advisory Action for U.S. Appl. No. 14/047,635 dated Jul. 10, 2014; 3 pages.
USPTO Final Rejection for U.S. Appl. No. 11/966,927 dated Jun. 8, 2011; 14 pages.
USPTO Final Rejection for U.S. Appl. No. 11/966,927 dated Dec. 10, 2010; 12 pages.
USPTO Final Rejection for U.S. Appl. No. 14/047,635 dated Apr. 30, 2014; 10 pages.
USPTO Non Final Rejection for U.S. Appl. No. 11/966,927 dated Jul. 6, 2010; 10 pages.
USPTO Non Final Rejection for U.S. Appl. No. 13/356,941 dated Mar. 20, 2013; 8 pages.
USPTO Non Final Rejection for U.S. Appl. No. 13/356,941 dated Aug. 22, 2012; 8 pages.
USPTO Non Final Rejection for U.S. Appl. No. 13/356,941 dated Nov. 26, 2012; 8 pages.
USPTO Non Final Rejection for U.S. Appl. No. 14/047,635 dated Sep. 18, 2014; 12 pages.
USPTO Non-Final Rejection for U.S. Appl. No. 14/047,635 dated Nov. 29, 2013; 12 pages.
USPTO Notice of Allowance for U.S. Appl. No. 11/966,927 dated Oct. 6, 2011; 8 pages.
USPTO Notice of Allowance for U.S. Appl. No. 13/356,941 dated Jul. 9, 2013; 9 pages.
USPTO Notice of Allowance for U.S. Appl. No. 13/356,941 dated Sep. 17, 2013; 9 pages.
USPTO Notice of Allowance for U.S. Appl. No. 14/047,635 dated Dec. 31, 2014; 9 pages.
Written Opinion of the International Searching Authority for International Application No. PCT/US08/88375 mailed Feb. 5, 2009; 4 pages.

* cited by examiner

CELLULAR COMMUNICATION DEVICE WITH WIRELESS POINTING DEVICE FUNCTION

CROSS-REFERENCE TO RELATED APPLICATIONS

This application is a continuation of U.S. patent application Ser. No. 14/047,635, filed Oct. 7, 2013, now U.S Pat. No. 8,983,538, issued Mar. 17, 2015, which is a continuation of U.S. patent application Ser. No. 13/356,941, filed Jan. 24, 2012, now U.S. Pat. No. 8,565,693, issued Oct. 22, 2013, which is a continuation of U.S. patent application Ser. No. 11/966,927, filed Dec. 28, 2007, now U.S. Pat. No. 8,103,223, issued Jan. 24, 2012, all of which are incorporated by reference herein in their entirety.

FIELD OF THE INVENTION

The present disclosure relates generally to wireless pointing device computer peripherals and to cellular communication devices or other communications devices.

BACKGROUND

Some computers, such as some personal computers and some laptop computers, use a pointing device, such as a mouse, as an input device to enable moving a cursor, clicking on icons, and other input capabilities. Some mice are "wired" and are connected by a cable to the computer. Other mice are wireless. A wireless mouse includes a wireless transceiver in the mouse and an associated wireless transceiver with the computer to couple the mouse to the computer over a wireless interconnect that replaces a cable. Particularly for portable computers, such as laptops, some users carry a mouse with the portable computer in order to be able to interact more effectively with the portable computer.

Cellular communication devices have become ubiquitous. Cellular communication devices communicate wirelessly with other communication devices over a cellular network. The cellular communication device is interconnected to the cellular network via a cellular base station, a cellular relay, or the equivalent. Some cellular communication devices also support a separate local wireless network connection, such as a Bluetooth network or an 802.11 network. Bluetooth network support is often used for peripherals, such as wireless headsets. 802.11 network support is used with some "smart" cellular communication devices, such as some Personal Digital Assistants (PDAs), to provide access to the Internet over a local wireless network.

SUMMARY

In some embodiments a device comprises: a first wireless transceiver adapted to communicate over a cellular network; a second wireless transceiver adapted to communicate over a local network separate from the cellular network; and a sensor adapted to report relative position information of the device via the second wireless transceiver, wherein the device is operable as a computer pointing device. According to various embodiments of the device, the device is operable as one or more of: a cellular telephone; and a wireless mouse. According to various embodiments of the device, the sensor comprises one or more of: an optical sensor; and a trackball. In some embodiments of the device, the second wireless transceiver is adapted to use a wireless Universal Serial Bus (USB) protocol. Various embodiments of the device further comprise an input mechanism, the input mechanism operable as left and right mouse buttons. In further embodiments of the device, the input mechanism is enabled to communicate via the second wireless transceiver.

In some embodiments, a method comprises: tracking movement of a cellular communication device; determining, responsive to the tracking, relative position information of the cellular communication device; receiving the relative position via a local wireless network including the cellular communication device and a computer; and controlling operation of the computer based, at least in part, on the relative position information. In some embodiments of the method, the cellular communication device is enabled to perform the tracking. In some embodiments of the method, the cellular communication device comprises a cellular telephone operable as a computer mouse. In some embodiments of the method, the controlling comprises moving a graphical icon on a display of the computer.

In some embodiments, a system comprises: a wireless adaptor adapted to interface with a computer; and a device operable as a cellular communication device over a cellular network and operable as a wireless pointing device via the wireless adaptor. According to various embodiments of the system, the device comprises one or more of: a sensor adapted to report position information of the device via the wireless adaptor; and a wireless transceiver adapted to communicate with the computer via the wireless adaptor. In further embodiments of the system, the position information comprises relative position information. In some embodiments of the system, the wireless adaptor is adapted to use a wireless Universal Serial Bus (USB) protocol. In some embodiments of the system, the device is further operable to transfer files resident on the device to the computer via the wireless adaptor. In some embodiments of the system, the device comprises a first device, and the system further comprises a second device operable as a wireless pointing device via the wireless adaptor; and the first device and the second device are enabled to communicate with the computer via the wireless adaptor at substantially a same time. In further embodiments of the system, the computer is enabled to run a gaming application, and the first device is enabled to control a first player of the gaming application, and the second device is enabled to control a second player of the gaming application.

DESCRIPTION OF THE DRAWINGS

The invention may best be understood by reading the disclosure with reference to the illustrative embodiments of the drawings.

DETAILED DESCRIPTION

A detailed description of one or more embodiments of the invention is provided below along with accompanying figures of illustrative embodiments of the invention. The invention is described in connection with such embodiments, but the invention is not limited to any embodiment. The scope of the invention is limited only by the claims and the invention encompasses numerous alternatives, modifications and equivalents. Specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

A user of a computer, such as a personal computer, a desktop computer, a portable computer, or a laptop, may often carry a separate pointing device, such as a mouse, even if the computer is equipped with a built-in pointing device, such as a touch screen or a touch pad. The accuracy, such as resolution, and the ergonomics of built-in pointing devices is sometimes less than desired by the user. Carrying a separate pointing device can be inconvenient. Furthermore, in situations where two or more people want to share control of an application on the computer, such as a multi-player gaining application, only the owner of the computer may have access to a pointing device.

A type of device that is frequently carried, independent of carrying a computer, is a cellular communication device. In some embodiments, incorporating pointing device functionality into a cellular communication device enables access to a pointing device in situations where a pointing device is not otherwise available, with greater convenience, and/or with operational advantages. In further embodiments, the cellular communication device including pointing device functionality is configured to communicate wirelessly with the computer. In some usage scenarios, multiple pointing devices, including at least one cellular communication device, are configured to communicate wirelessly with a computer, enabling multiple users (players) to control a single application (such as a gaming application).

While parts of the description below refer to the pointing device as a mouse, various embodiments use different types of pointing devices, alone or in combination. Devices or systems referring to, or referred as, a cellular communication device may be understood as being applicable to various types of cellular devices and communication devices known in the art, such as personal digital assistants (PDAs), cellular telephones, pagers, etc.

In a first example embodiment, a device includes cellular communication device functionality, a sensor, such as an optical or mechanical position sensor, and a wireless transceiver (independent of a transceiver used for the cellular communication device functionality). The sensor is enabled to report position information, such as relative position information, to a computer via the wireless transceiver, allowing a user of the device to interact with and/or to control the computer. In a second example embodiment, a device includes cellular communication device functionality, a touch screen, and a wireless transceiver (independent of a transceiver used for the cellular communication device functionality). The touch screen is used to interact with and/or to control the cellular communication device functionality. Additionally, the touch screen is used as a wireless touch pad to interact with and/or to control a computer via the wireless transceiver. The second example embodiment does not require a position sensor as the touch screen provides the pointing (movement) information used to interact with and/or to control the computer.

In various embodiments, such as either of the first example embodiment or the second example embodiment, some of the input mechanisms (such as buttons, wheels, joysticks, or touch screens) of the device are enabled to interact with and/or to control the cellular communication device functionality. The input mechanisms are additionally enabled, optionally in an operating mode, to interact with and/or to control a computer via the wireless transceiver. For example, a particular one of the buttons of the device is used to initiate a communication device call when the device is operating as a cellular communication device, and the particular button is enabled to operate as a left mouse button when the device is operating as a wireless pointing device.

Figure 1:
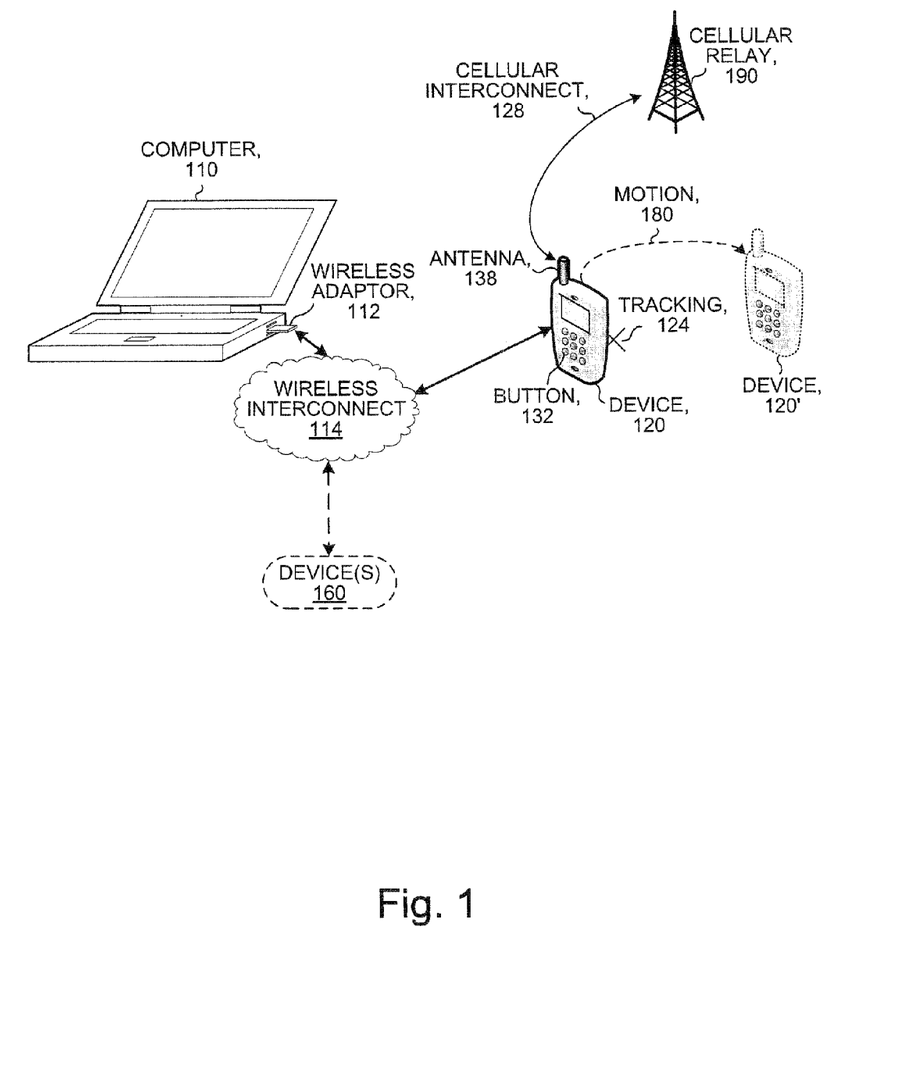
FIG. 1 illustrates selected details of an illustrative embodiment of a system including a wireless adaptor and a device operable as a cellular communication device and as a wireless pointing device.

FIG. 1 illustrates selected details of an illustrative embodiment of a system including a wireless adaptor and a device operable as a cellular communication device and as a wireless pointing device.

Computer 110 includes and/or is coupled to wireless adaptor 112. In some embodiments, wireless adaptor 112 is built into computer 110, such as by being on a motherboard of computer 110. In further embodiments, wireless adaptor 112 is integrated with other portions of computer 110 in an integrated circuit, such as by being a portion of a Southbridge chip or chipset. In other embodiments, wireless adaptor 112 is connected via a peripheral interconnect, such as a Personal Computer Memory Card International Association (PCMCIA) slot, a Universal Serial Bus (USB) slot, a Peripheral Component Interconnect (PCI) slot, or another computer peripheral interconnection.

Wireless adaptor 112 enables computer 110 to communicate over wireless interconnect 114 with one or more devices, such as device 120 and optionally device(s) 160. In some embodiments, device 120 is a device including cellular communication device functionality and wireless pointing device functionality. The cellular device functionality enables communication, via device 120 over a particular cellular network. According to various embodiments, devices(s) 160 are one or more of: a same type of device as device 120 and enabled to communicate via the particular cellular network; a same type of device as device 120 and enabled to communicate via a different cellular network; a different type of device from device 120, such as a wireless keyboard, a wireless mouse, a PDA, or a pager; and any other communication device.

In some embodiments, wireless adaptor 112 is adapted to communicate with computer 110 using a protocol, such as Universal Serial Bus (USB), Peripheral Component Interconnect (PCI), or another protocol for peripheral interconnection. Devices 120, 160 are enabled to communicate with wireless adaptor 112 using respective local wireless transceivers (such as wireless transceivers internal to devices 120, 160) over wireless interconnect 114. (In various embodiments, the local wireless transceiver is part of a wireless logic function, such as wireless logic 224 including transceiver 225 as illustrated in FIG. 2B.) Wireless interconnect 114 uses a protocol that is optionally different from the protocol between wireless adaptor 112 and computer 110. Devices 120, 160 are enabled to communicate with the respective local wireless transceivers using protocol that is optionally different from the wireless interconnect protocol. In one example, wireless adaptor 112 is adapted to communicate with computer 110 using a USB protocol, and wireless interconnect 114 uses a Bluetooth protocol. In another example, wireless interconnect 114 uses a wireless USB protocol, and device 120 is enabled to communicate with the respective local wireless transceiver using a USB protocol.

In some embodiments, wireless adaptor 112 uses a wireless USB protocol operating at 2.4 GHz, and is adapted to communicate using a Direct Sequence Spread Spectrum (DSSS) technique to avoid interference from other 2.4 GHz technologies, such as Bluetooth or 802.11. For example, in various embodiments, wireless adaptor 112 uses a Cypress Semiconductor CYRF6936 chip, which provides a single-chip wireless USB solution and enables point to multi-point (a USB host to one or more devices) operation. In some usage scenarios, wireless USB provides a non-networking solution with lower overhead than networking solutions such as Bluetooth, while providing a point to multi-point capability. Information on Cypress Semiconductor's proprietary wireless USB standard is available from a web site at wirelessusb.org.

When one or more devices, such as devices 120, 160, communicate with computer 110 over wireless interconnect 114, the one or more devices are enabled to communicate at substantially a same time. In some embodiments, communications of the one or more devices are interleaved at a fine-grained level, such as at a packet level, on wireless interconnect 114 so that each of the one or more devices communicates serially with computer 110, but for practical purposes, the result is communication substantially at a same time.

Device 120 includes antenna 138. In some embodiments, device 120 includes a cellular wireless transceiver coupled to antenna 138. (In various embodiments, the cellular wireless transceiver is part of a cellular logic function, such as cellular logic 228 including transceiver 229 as illustrated in FIG. 2B.) The cellular wireless transceiver and antenna 138 enable device 120 to communicate over cellular interconnect 128 with a cellular network and thus to operate as a cellular communication device. The cellular interconnect couples device 120 to cellular relay 190, a cellular base station, or another type of gateway to the cellular network. In some embodiments, antenna 138 is an internal antenna. In other embodiments, as illustrated in FIG. 1 and in others of the figures, antenna 138 is an external (protruding from, the otherwise roughly box-shaped device) antenna.

In some embodiments, antenna 138 is used for communication over both cellular interconnect 128 and wireless interconnect 114. In further embodiments, antenna 138 illustrates a housing for a plurality of antennas, and a first one of the plurality of antennas is used for communication over cellular interconnect 128, and a second one of the plurality of antennas is used for communication over wireless interconnect 114.

In other embodiments, device 120 includes a separate antenna (such as antenna 227 as illustrated in FIG. 2B) for communication via the respective local wireless transceiver. In further embodiments, the separate antenna is internal. For example, in various embodiments, the separate antenna is integrated onto a printed circuit board inside device 120.

In various embodiments, device 120 includes a sensor enabled to track movement of device 120. As illustrated in FIG. 1, when device 120 is moved via motion 180 to the position indicated by device 120', such as via sliding device 120 on a tracking surface, the sensor, via tracking 124, is enabled to detect and to report the movement. In some embodiments, the sensor is an optical sensor, such as a laser navigation sensor, and tracking 124 represents illumination provided by the sensor. In other embodiments, the sensor is a mechanical sensor, such as a trackball. Various types of sensors are compatible with other aspects of the techniques herein. For example, the sensor could be implemented, at least in part, by a Cypress Semiconductor CYONS1001 single-chip laser navigation sensor. A laser navigation sensor provides a high degree of accuracy, such as sensing rate of more than 2000 counts per inch, and fast tracking speeds, such as up to 50 inches per second.

In some embodiments, the sensor is enabled to report relative position information of device 120 over wireless interconnect 114 to computer 110. That is, as device 120 is moved, the sensor is enabled to report movement relative to a previous position of device 120. For example, as device 120 is moved, a delta in an X direction and a delta in a perpendicular Y direction are reported.

In some embodiments, device 120 includes a touch screen. Motion information input by a user via the touch screen is reported over wireless interconnect 114 to computer 110. In further embodiments, device 120 does not include a sensor for tracking motion of device 120, and the touch screen is configured to provide motion information to computer 110.

Device 120 includes one or more input mechanisms, such as button 132. Button 132 is representative of a variety of input mechanisms, such as buttons, navigation sticks, scroll wheels, keyboards, keypads, touch screens, virtual (on-screen) controls, and other input mechanisms. (Further embodiments of input mechanisms are described with regard to FIG. 2C.) Button 132 is used, at least in part, to control operation of device 120. Button 132 optionally and/or selectably operates in different modes. For example, in a communication mode, button 132 operates to control cellular communication device operation of device 120, and in a pointer mode, button 132 operates as a mouse button in conjunction with use of device 120 as a wireless mouse. In some embodiments, functionality of various ones of the input mechanisms of device 120 is configurable by a user of device 120. In various embodiments, device 120 has one or more modes of operation, such as a cellular communication device mode and a wireless mouse mode, and functionality of one or more of the input mechanisms of device 120 is dependent on a current one of the modes of operation.

In some embodiments, device 120 is enabled to transfer files, such as files resident on device 120, to or from computer 110 over wireless interconnect 114. According to various embodiments, the files are transferred under control of one or more of: computer 110; a controller of device 120 (such as CPU 226 as illustrated in FIG. 2B); and a user of device 120. In one example embodiment, device 120 includes a camera, and at least some of the files are pictures. In another example embodiment, device 120 includes a music player, such as an MP3 player, and at least some of the files are digitally recorded songs. In yet another example embodiment, device 120 is enabled to execute user applications, such as a calendar, a word processor, or a spreadsheet, and at least some of the files are data files and/or documents associated with the user applications.

Figure 2A:
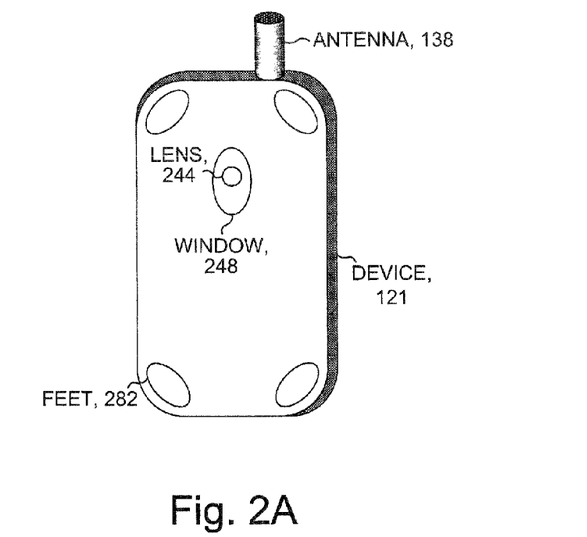
FIG. 2A illustrates selected details of an offset bottom view of an illustrative embodiment of a device operable as a cellular communication device and as a wireless pointing device.
Figure 2B:
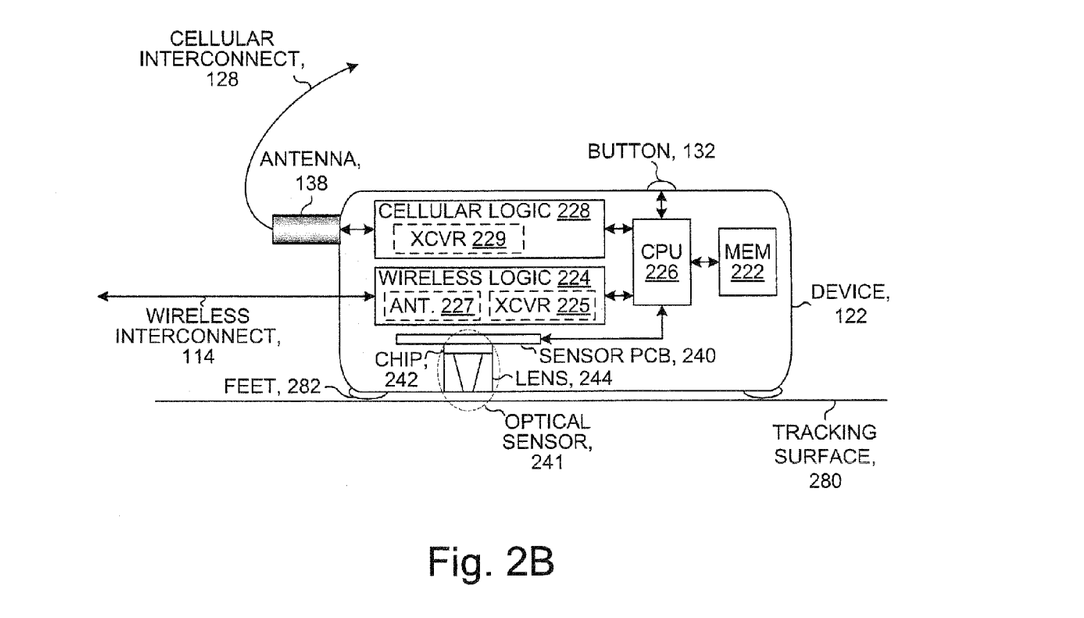
FIG. 2B illustrates selected details of a cut-away side view of an illustrative embodiment of a device operable as a cellular communication device and as a wireless pointing device.

FIG. 2A illustrates selected details of an offset bottom view of an illustrative embodiment of a device operable as a cellular communication device and as a wireless pointing device. In various embodiments, device 121 is the same as device 120 (as illustrated in FIG. 1).

In some embodiments, device 121 includes one or more feet 282. Feet 282 provide a way to enable device 121 to slide more easily on a tracking surface, such as tracking surface 280 as illustrated in FIG. 2B. While FIG. 2A illustrates four feet, any number of feet, including zero feet, is optionally used in different embodiments, depending on mechanical, material, optical, and other constraints and/or relationships. In various embodiments, the number, size, height, and/or nature of the feet vary with a type of sensor, if any, used in device 121, such as whether a motion tracking sensor is mechanical or optical.

The illustrative embodiment of FIG. 2A uses an optical sensor as a motion tracking sensor (to provide tracking 124, as illustrated in FIG. 1). The bottom of device 121 includes window 248, such as a transparent or translucent glass or plastic window, and lens 244 for the optical sensor located in device 121. For example, in some embodiments, the window enables an integral light source to illuminate the tracking surface, and the lens focuses reflections from the tracking source on an optical detector.

FIG. 2B illustrates selected details of a cut-away side view of an illustrative embodiment of a device operable as a cellular communication device and as a wireless pointing device. According to various embodiments, device 122 is the same as one or more of device 120 (as illustrated in FIG. 1), and device 121 (as illustrated in FIG. 2A).

Device 122 includes a motion tracking sensor. In some embodiments, the motion tracking sensor comprises an optical sensor, such as optical sensor 241. The optical sensor includes chip 242 and lens 244, and is mounted on sensor printed circuit board (PCB) 240. Some chips, such as the Cypress Semiconductor CYONS1001, include an integrated Vertical-Cavity Surface Emitting Laser (VCSEL) light source and an optical detector. With a chip such as the CYONS1001, a lens and some discrete components such as capacitors and resistors provide for a complete optical sensor.

Device 122 further includes cellular logic 228, wireless logic 224, and a controller such as Central Processing Unit (CPU) 226. In some embodiments, cellular logic 228 includes cellular wireless transceiver 229, and is coupled to antenna 138, enabling device 122 to communicate over cellular interconnect 128 with a cellular network.

In some embodiments, wireless logic 224 includes local wireless transceiver 225, enabling device 122 to communicate over wireless interconnect 114. In various embodiments, antenna 138 (or one of a plurality of antennas inside a housing illustrated by antenna 138) is used to communicate over wireless interconnect 114. In other embodiments, wireless logic 224 includes separate antenna. 227 for the local wireless transceiver. For example, in some embodiments, the separate antenna is integrated onto a printed circuit board containing wireless logic 224.

A controller, such as CPU 226, is illustrative of one of many possible ways in which electrical and/or electronic components of device 122 are interconnected. For example, according to various embodiments, one or more of cellular logic 228, wireless logic 224, and the optical sensor have respective controllers, and the respective controllers are optionally and/or selectably coupled together. In the illustrative embodiment of FIG. 2B, CPU 226 is configured to control device 122. For example, CPU 226 is adapted to receive position information from the optical sensor, and is enabled to report the position information, optionally in a summarized fashion, using wireless logic 224 to communicate over wireless interconnect 114. In various embodiments, CPU 226 includes two or more specialized controllers or CPUs, such as an input mechanism controller and one or more network controllers.

In some embodiments, CPU 226 is coupled to memory (MEM) 222. According to various embodiments, memory 222 is enabled to store one or more of: files resident on device 122; code to be executed by CPU 226; control and/or configuration information for device 122; data, such as packets, being sent to or from cellular interconnect 128; data, such as packets, being sent to or from wireless interconnect 114; and other data and/or code for controlling and/or operating device 122. In some embodiments, memory 222 is coupled to one or more of cellular logic 228 and wireless logic 224. In further embodiments device 122 includes a Direct Memory Access (DMA) function, and one or more of cellular logic 228 and wireless logic 224 are enabled to transfer data to memory 222 without CPU 226 moving the data. According to various embodiments, memory 222 includes any type or combination of types of memory that is able to be interfaced to CPU 226, such as Static Random Access Memory (SRAM), Dynamic Random Access Memory (DRAM), Programmable Read-Only Memory (PROM), Electrically Erasable Programmable Read-Only Memory (EEPROM), or flash memory.

In the illustrative embodiment of FIG. 2B, button 132 is coupled to CPU 226. CPU 226 is enabled to detect on and/or off indications of button 132 (or similar indications from other input mechanisms of device 122), and to optionally and/or selectably report the indications via wireless logic 224. In some embodiments, whether and/or how the indications are reported via wireless logic 224 is dependent on an operating mode and/or on configuration, such as user configuration, of device 122.

In some embodiments, components of device 122, such as cellular logic 228 and wireless logic 224 are incorporated on one or more printed circuit boards mounted inside device 122. In various embodiments, some or all of the components are mounted on sensor printed circuit board 240. Many ways of physically organizing and coupling the components are possible within the scope of the techniques taught herein.

In some embodiments, wireless logic 224 and chip 242 are both mounted on sensor printed circuit board 240, and chip 242 is directly coupled to wireless logic 224 to report position information without intervention of CPU 226. In these embodiments, CPU 226 is used to initialize and for exceptions related to chip 242, and is not involved in the direct reporting of position information.

In other embodiments, CPU 226 acts as an intermediary between chip 242 and wireless logic 224. Additionally, CPU 226 is enabled to process, such as by translating and/or summarizing and/or performing a protocol conversion, the position information determined by chip 242 prior to reporting the position information via wireless logic 224.

In various embodiments, CPU 226 is enabled to receive control information, such as commands, via wireless logic 224, and to use the control information to control operation of chip 242. For example, in response to a command received from a computer (such as computer 110 as illustrated in FIG. 1) via wireless logic 224, CPU 226 is enabled to control the accuracy and/or the sensitivity of chip 242.

In some embodiments, CPU 226 is enabled to control power modes of chip 242, either independently, or in response to control information received via wireless logic 224. According to various embodiments, the power modes include a normal mode, a low power mode, a sleep mode, and a hibernate mode.

Figure 2C:
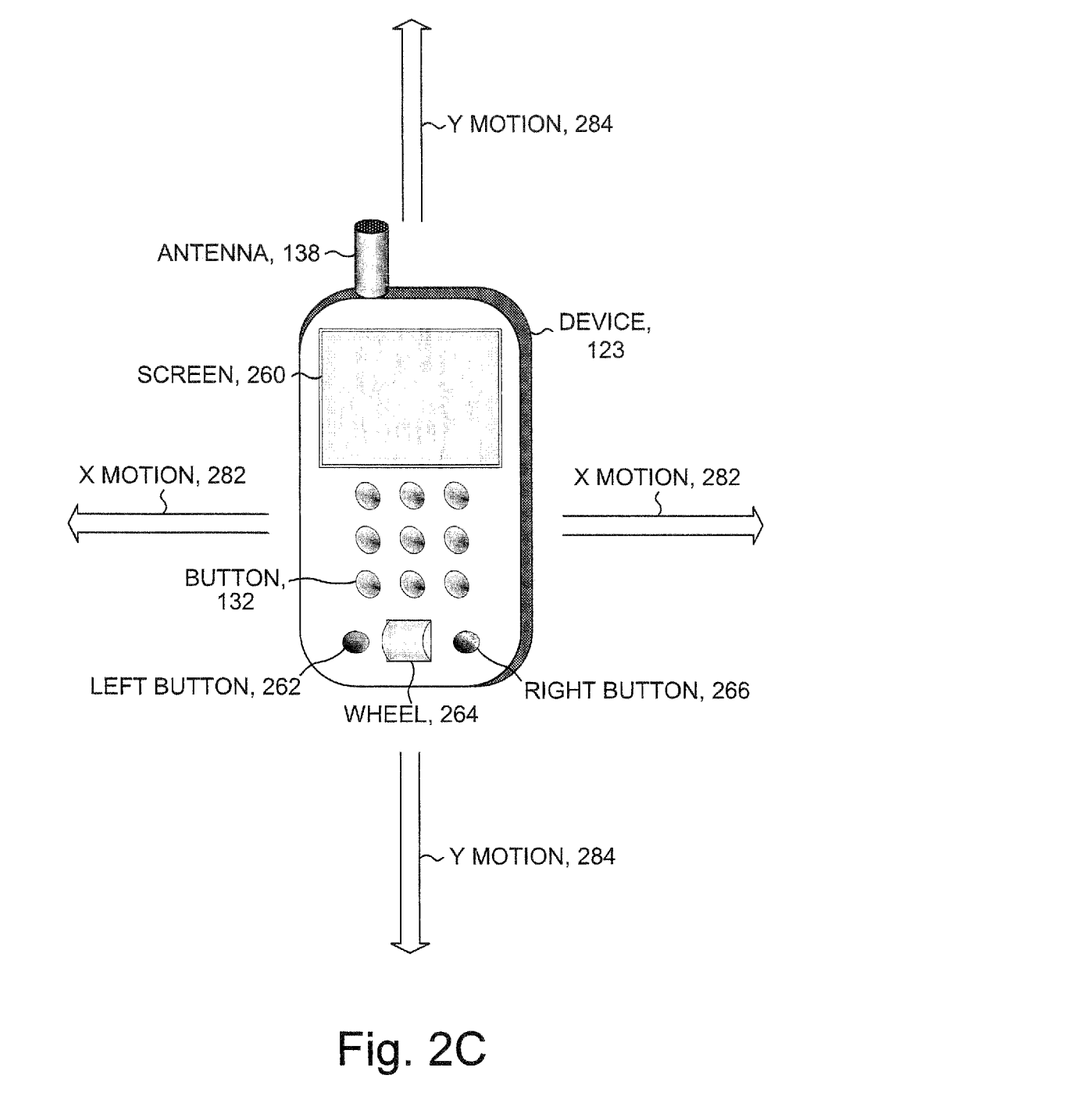
FIG. 2C illustrates selected details of an offset top view of an illustrative embodiment of a device operable as a cellular communication device and as a wireless pointing device, and including multiple input mechanisms.

FIG. 2C illustrates selected details of an offset top view of an illustrative embodiment of a device operable as a cellular communication device and as a wireless pointing device, and including multiple input mechanisms. According to various embodiments, device 123 is the same as one or more of device 120 (as illustrated in FIG. 1), device 121 (as illustrated in FIG. 2A), and device 122 (as illustrated in FIG. 2B).

According to various embodiments, device 123 includes one or more of the illustrated input and/or output mechanisms: button 132, screen 260, left button 262, wheel 264, right button 266. Screen 260 is used as a display (an output mechanism). In some embodiments, screen 260 is a touch-sensitive screen and is one of the input mechanisms. Other input and/or output mechanisms are compatible with the techniques taught herein. For example, in further embodiments, device 123 includes an audio output mechanism, such as a speaker, and an audio input mechanism, such as a microphone.

In some embodiments, and when being used as a pointing device, left button 262 and right button 266 are configured to operate as a left mouse button and a right mouse button, such as for a two-button mouse. In further embodiments, wheel 264 is configured to operate as a middle mouse button and/or as a mouse wheel. Many ways of organizing, arranging and specifying the function of the input and/or output mechanisms are possible within the scope of the techniques taught herein.

Any or all of the input mechanisms are optionally, according to various embodiments, programmable to affect operation of device 123 in one or more ways. For example, in some embodiments, left button 262 is programmable to operate as a left mouse button in a pointer mode, and as a "pick-up call" button in a communications mode.

Figure 3:
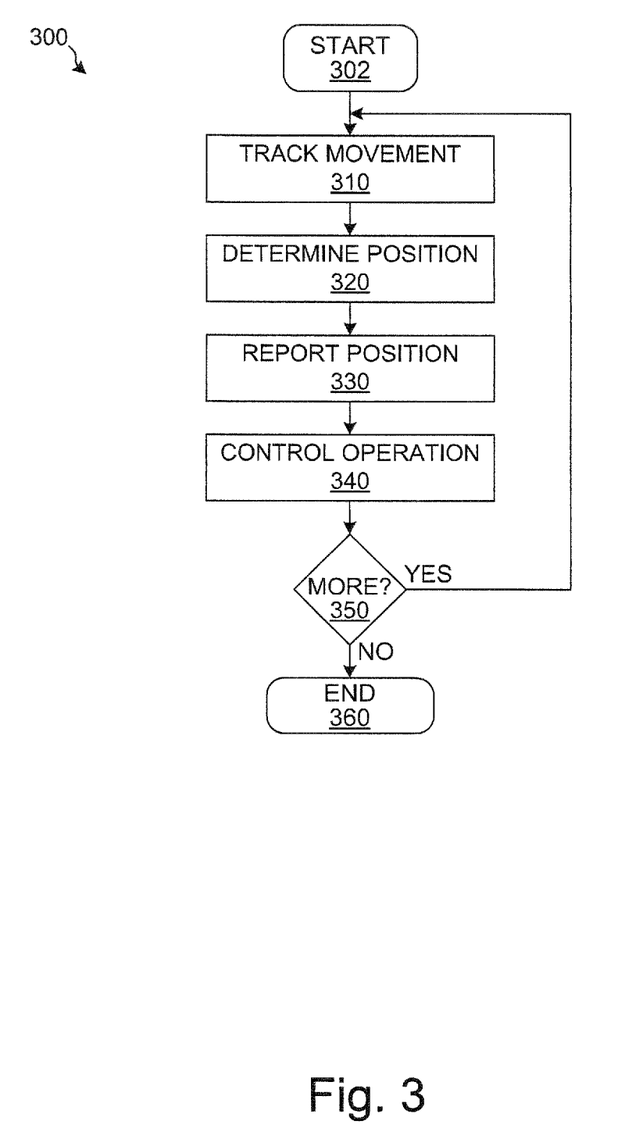
FIG. 3 illustrates selected details of a process used in an illustrative embodiment with a device operable as a cellular communication device and as a wireless pointing device.

FIG. 2C also illustrates motion of device 123, such as motion 180 of device 120 as illustrated in FIG. 1. The motion of device 123 has an X axis component (X motion 282) and a perpendicular Y axis component (Y motion 284). Of course, the particular arrangement of the X and Y axes illustrated in FIG. 3 is arbitrary, and, for example, the X and Y axes could be swapped, or the X and Y axes could be rotated. Similarly, in other embodiments, the coordinate system used is polar, rather than rectangular.

When device 123 is moved, such as by sliding device 123 on a tracking surface (such as tracking surface 282 as illustrated in FIG. 2B), the motion of device 123 is detected by a sensor (such as described with reference to FIG. 2B). The sensor is enabled to report one or more components of the motion (such as an X component represented by X motion 282 and a Y component represented by Y motion 284). In some embodiments, the motion of device 123 is reported as a relative (to a previous position of device 123) movement in the X and/or Y axes.

FIG. 3 illustrates selected details of a process used in an illustrative embodiment with a device, such as device 120 of FIG. 1, operable as a cellular communication device and as a wireless pointing device. Process 300 starts ("Start," 302), for example, when the device is operated as a wireless pointing device, such as when a user changes an operating mode of the device to use the device as a wireless pointing device.

Process 300 includes multiple elements, and according to various embodiments, the elements are performed serially, in parallel, or in any combination of serially and in parallel. The linear flow of the multiple elements in FIG. 3 is merely illustrative. Furthermore, according to various embodiments, the device is able to perform other processes or operations during operation of process 300. As a few of many examples of operations that, according to various embodiments, are performed during the operation of process 300: initiating a telephone call; receiving a telephone call; participating in a telephone call; indicating a reminder (such as a calendar reminder); receiving a text message; and other operations performed by a cellular communication device, a PDA, a pager, or another communication device.

In process 300, the device is enabled to track movement of the device ("Track Movement," 310), such as with a motion sensor (for example, optical sensor 241 as illustrated in FIG. 2B). Tracking the movement enables determining position information of the device ("Determine Position," 320). In some embodiments, the position information is relative position information (as explained with regard to FIG. 2C). The position information is reported ("Report Position," 330), such as over a wireless interconnect (for example, wireless interconnect 114 as illustrated in FIG. 1). Reporting the position information includes the device sending the position information over the wireless interconnect, and another entity, such as computer 110 as illustrated in FIG. 1, receiving the position information from the wireless interconnect. In some embodiments, reporting the position information also reports indications of input mechanisms of the device, such as pressing or releasing of selected buttons, movement of scroll wheels, or input provided on a touch screen.

The reported position information is used, at least in part, to control operation of the other entity ("Control Operation," 340). For example, in some embodiments, the reported position information is used to control a graphical icon, such as a cursor, on a display of computer 110, or to control operation of an application on computer 110.

Process 300 continues ("More?" 350), repeating the "Track Movement" 310, "Determine Position" 320, "Report Position" 330, and "Control Operation" 340 elements, as long as the device is operated as a wireless pointing device. For example, in some embodiments, process 300 ends ("End," 360) when a user changes an operating mode of the device.

Figure 4:
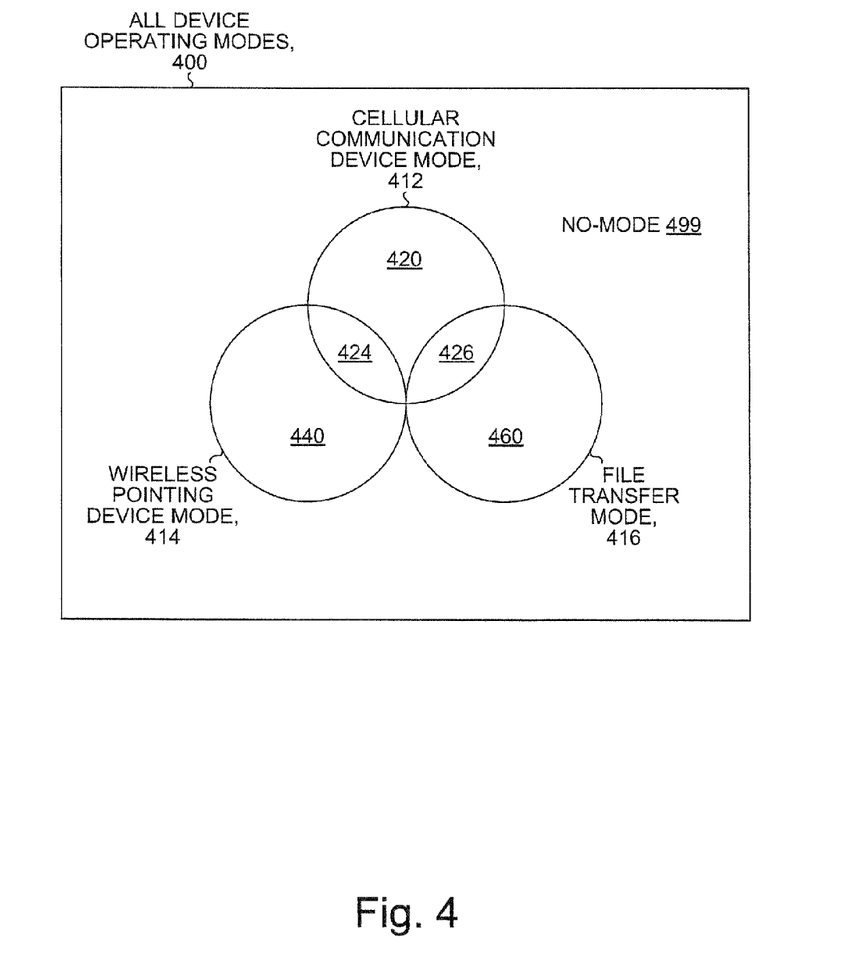
FIG. 4 illustrates an example of operating modes of a device operable as a cellular communication device and as a wireless pointing device.

FIG. 4 illustrates an example of operating modes of a device, such as device 120 of FIG. 1, operable as a cellular communication device and as a wireless pointing device. As illustrated in the example of FIG. 4, the space of all device operating modes 400 of the device includes three primary operating modes represented as circles: cellular communication device mode 412, wireless pointing device mode 414, and file transfer mode 416. The primary operating modes are illustrated as creating overlapping regions where more than one primary operating mode is active (such as region 424), and non-overlapping regions where only a single primary operating mode is active (such as region 420). Outside of any of the primary operating modes is a "no-mode" region 499 where none of the primary operating modes are active. For example, no-mode region 499, in some embodiments, corresponds to a "flight mode" where all communication modes are disabled.

According to various embodiments, a default operating mode of the device is one or more of an operating mode corresponding to region 420; an operating mode corresponding to another one of the regions; and an operating mode selectable by a user of the device, such as via a menu on a screen of the device.

According to various embodiments, a current operating mode of the device is one or more of: selectable by a user of the device, such as via a menu on a screen of the device, or via an input mechanism of the device (such as a button);

changeable due to external events, such as the arrival of a telephone call or an initiation of a file transfer to the device by a computer or a device communicating over a wireless interconnect; and changeable due to internal events, such as alarms, timers, or battery indications.

When the device is operating in an operating mode corresponding to region 420, the device is operable as a cellular communication device, and is not operable as a wireless pointing device or enabled to transfer files.

When the device is operating in an operating mode corresponding to region 440, the device is operable as a wireless pointing device, and is not operable as a cellular communication device or enabled to transfer files.

When the device is operating in an operating mode corresponding to region 460, the device is operable for file transfer, and is not operable as a cellular communication device or as a wireless pointing device.

When the device is operating in an operating mode corresponding to region 424, the device is operable as a cellular communication device and as a wireless pointing device, and is not enabled to transfer files.

When the device is operating in an operating mode corresponding to region 426, the device is operable as a cellular communication device and for file transfer, and is not operable as a wireless pointing device.

In some embodiments, the device optionally and/or selectably has additional capabilities and/or functions in one or more of the operating modes. For example, in some embodiments, when operating in an operating mode corresponding to region 424, device 120 as illustrated in FIG. 1 has additional capabilities. Arrival of a telephone call is enabled to send a "pause" command over wireless interconnect 114, thus pausing operation of an application (such as a gaming application). In further embodiments, the pause command is sent automatically. In other embodiments, a user of the device is notified of the phone call, and the pause command is sent under control of the user, such as by activating an input mechanism of the device. In various embodiments, accepting the call changes the operating mode of the device. Continuing the example, an input mechanism of the device is enabled to cause a "resume" command to be sent over wireless interconnect 114 (in response to a user activating the input mechanism) when the telephone call is completed (or when the user decides not to accept the call). In various embodiments, sending the "resume" command changes the operating mode of the device.

The example of FIG. 4 does not illustrate an operating mode in which the device is operable as both a wireless pointing device and for file transfer. Such an operating mode is not precluded, it is just not illustrated in the example of FIG. 4. Of course, according to various embodiments, other operating modes and other arrangements of operating modes are used. For example, in various embodiments, the device has operating modes including one or more of: cellular communication device mode, wireless pointing device mode, file transfer mode, web browsing mode, pager mode, game-playing mode, MP3-playing mode, camera mode, TV-watching mode, and other operating modes of use in cellular telephones, PDAs, pagers, communication devices, and other portable devices. Any of the operating modes is, according to various embodiments, enabled to operate at a same time as any others of the operating modes.

According to various embodiments, selection of one or more current operating modes of the device, features of operation in the operating modes, and functions of the input mechanisms of the device in the operating modes are all selectable by a user of the device, such as via a menu displayed on a screen of the device.

One of skill in the art will recognize that the concepts taught herein can be tailored to a particular application in many other advantageous ways. In particular, those skilled in the art will recognize that the illustrated embodiments are but some of many alternative implementations that will become apparent upon reading this specification.

The preceding embodiments are exemplary and not restrictive. Although the specification may refer to "an", "one", "another", or "some" embodiment(s) in several locations, this does not necessarily mean that each such reference is to the same embodiment(s), or that any features described apply only to specific embodiments.

What is claimed is:

1. An apparatus comprising:
a wireless mobile device configured to receive user input;
a sensor device to detect the user input;
wireless logic to communicate based on the received user input, through a first wireless network, to control an operation of an other device, wherein the control of the operation of the other device includes moving a graphical icon displayed on video display of the other device corresponding to a movement trajectory of the received user input; and
a detector responsive to detect an incoming communication over a second wireless network, and is configured to notify a user of the incoming communication.

2. The apparatus of claim 1, wherein the operation is part of a software application of the other device.

3. The apparatus of claim 1, wherein the sensor device is an optical sensor.

4. The apparatus of claim 1, where the sensor device is a mechanical trackball sensor.

5. The apparatus of claim 1, wherein the sensor device is a touch screen.

6. The apparatus of claim 1, wherein responsive to input from the user notified of the incoming communication, the detector is further configured to transmit a pause command over the first wireless network to pause an operation of the other device in a pause state.

7. The apparatus of claim 6, wherein if the incoming communication is completed, the detector is further configured to transmit a resume command over the first wireless network to resume the operation of the other device in an operation state.

* * * * *